United States Patent
Huh et al.

(10) Patent No.: US 10,887,309 B2
(45) Date of Patent: Jan. 5, 2021

(54) APPARATUS AND SYSTEM FOR MANAGING TRANSACTION INFORMATION OF PUBLIC ORGANIZATION USING BLOCKCHAIN TECHNOLOGY

(71) Applicant: ELECTRONICS AND TELECOMMUNICATIONS RESEARCH INSTITUTE, Daejeon (KR)

(72) Inventors: Seyoung Huh, Daejeon (KR); Seok Hyun Kim, Daejeon (KR); Soo Hyung Kim, Daejeon (KR); Seung-Hyun Kim, Daejeon (KR); Youngsam Kim, Daejeon (KR); Jong-Hyouk Noh, Daejeon (KR); Sangrae Cho, Daejeon (KR); Young Seob Cho, Daejeon (KR); Jin-Man Cho, Daejeon (KR); Jung Yeon Hwang, Daejeon (KR); Seung Hun Jin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 331 days.

(21) Appl. No.: 15/867,525

(22) Filed: Jan. 10, 2018

(65) Prior Publication Data
US 2018/0198794 A1    Jul. 12, 2018

(30) Foreign Application Priority Data
Jan. 10, 2017    (KR) ........................ 10-2017-0003562

(51) Int. Cl.
*H04L 29/06* (2006.01)
*H04L 9/06* (2006.01)
(Continued)

(52) U.S. Cl.
CPC ............. *H04L 63/10* (2013.01); *G06Q 30/08* (2013.01); *G06Q 40/12* (2013.12); *H04L 9/0637* (2013.01);
(Continued)

(58) Field of Classification Search
CPC .......... G06F 21/64; H04L 63/10; H04L 29/06
See application file for complete search history.

(56) References Cited

U.S. PATENT DOCUMENTS

| 6,299,062 | B1 | 10/2001 | Hwang |
| 9,258,307 | B2 | 2/2016 | Pianese et al. |

(Continued)

FOREIGN PATENT DOCUMENTS

| KR | 10-1626276 B1 | 6/2016 |
| WO | WO 2016/022864 A2 | 2/2016 |

OTHER PUBLICATIONS

Satoshi Nakamoto, "Bitcoin: A Peer-to-Peer Electronic Cash System", 2008, pp. 1-9.
(Continued)

*Primary Examiner* — Mariela Reyes
*Assistant Examiner* — Courtney Harmon

(57) ABSTRACT

A transaction information managing system including a plurality of servers and at least one third-party server, wherein the plurality of servers are configured to create, when transactions using the budget of the public organization occurs, a block based on transaction information of the transactions, add the block to the block chain, and share the block chain and the at least one third-party server is configured to perform a mathematical operation to enhance the reliability of the block chain, and a method for managing the transaction information are provided.

8 Claims, 6 Drawing Sheets

(51) Int. Cl.
   *G06Q 30/08* (2012.01)
   *G06Q 40/00* (2012.01)
   *H04L 9/32* (2006.01)

(52) U.S. Cl.
   CPC .......... *H04L 9/3239* (2013.01); *H04L 63/123* (2013.01); *H04L 2209/38* (2013.01); *H04L 2209/56* (2013.01); *H04L 2463/102* (2013.01)

(56) References Cited

U.S. PATENT DOCUMENTS

| | | |
|---|---|---|
| 2004/0186998 A1 | 9/2004 | Kim et al. |
| 2015/0332283 A1* | 11/2015 | Witchey .................. G06F 21/00 705/3 |
| 2016/0330034 A1† | 11/2016 | Back et al. |
| 2016/0342977 A1† | 11/2016 | Lam |
| 2017/0116693 A1* | 4/2017 | Rae .................... G06Q 20/3827 |
| 2017/0134765 A1 | 5/2017 | Uhr et al. |
| 2017/0237554 A1* | 8/2017 | Jacobs .................... G06F 21/64 713/171 |
| 2018/0053182 A1* | 2/2018 | Mokhasi ............... H04L 63/126 |
| 2018/0115538 A1† | 4/2018 | Blake |
| 2018/0225611 A1* | 8/2018 | Daniel ............. G06Q 10/06315 |

OTHER PUBLICATIONS

Svein Olnes, Beyond Bitcoin Enabling Smart Government Using Blockchain Technology, Western Norway Research Institute, Sogndal Norway, Published by Springer International Publishing Switzerland 2016.†

\* cited by examiner
† cited by third party

APPARATUS AND SYSTEM FOR MANAGING TRANSACTION INFORMATION OF PUBLIC ORGANIZATION USING BLOCKCHAIN TECHNOLOGY

CROSS-REFERENCE TO RELATED APPLICATION

This application claims priority to and the benefit of Korean Patent Application No. 10-2017-0003562 filed in the Korean Intellectual Property Office on Jan. 10, 2017, the entire contents of which are incorporated herein by reference.

BACKGROUND OF THE INVENTION

(a) Field of the Invention

This description relates to a method and a system for managing transaction information of public organization using a blockchain technology.

(b) Description of the Related Art

An income history or an expenditures history of the public organizations that enforce the national budget and non-profit organizations that raise donations needs to be transparently managed.

However, even though there are many possibilities that the server may be attacked or manipulated/tampered internally, it is difficult for ordinary citizens or donors to know the income history and the expenditures history of public organizations.

SUMMARY OF THE INVENTION

The present disclosure has been made in effort to provide an apparatus and an system for managing transaction information of public organization by using block chain technology.

An exemplary embodiment provides a server for managing transaction information of a public organization, the server comprising: a processor, a memory, and a transceiver, wherein the processor executes a program stored in the memory to perform: creating a block based on the transaction information of a transaction when the transaction regarding a budget of the public organization is generated; adding the created block to a first block chain, updating a block chain according to a predetermined period based on a second block chain in which a block is added by a server of other public organization or a third block chain in which a block is added by a third-party server, and the first block chain; transmitting the first block chain to the server of the other public organization or the third-party server and receiving the second block chain or the third block chain from the server of the other public organization or the third-party server, respectively, by using the transceiver, wherein the third-party server is located outside a network to which the server and the server of the other public organization are connected.

The processor, by using the transceiver, may further perform: receiving an access request for the block chain from the third-party server; forwarding an instruction whether the access request is approved to the third-party server; and receiving the third block chain from the third-party server when the access request is approved.

When the processor performs creating a block based on the transaction information of a transaction when the transaction regarding a budget of the public organization is generated, the processor may perform: creating a genesis block by inserting information about a date proving that the block chain has been crated after a particular point of time.

The hash power of the server may be $1/n$ when the block chain is shared by servers of n public organizations and whole hash power of the servers of the n public organizations is 1.

The hash power of the server may be $1/(1.2n)$ to $1/(0.8n)$ when the block chain is shared by servers of n public organizations and whole hash power of the servers of the n public organizations is 1.

When the processor performs updating a block chain according to a predetermined period, the processor, by using the transceiver, may perform: receiving an access request for the block chain from the third-party server; and forwarding an access approval to the third-party server when hash power of the third-party server is less than the hash power of the server.

When the processor performs adding the created block to a first block chain, the processor may perform: creating the block based on at least one of the transaction information, a proof of work, and time information of a point of time at which the block is created, wherein the work is information that takes a predetermined amount of time to resolve under predetermined computing performance.

The transaction information may include expenditure information which is an expenditure history of the budget and income information which is an income history of the budget.

Another exemplary embodiment provides a server for managing transaction information of a public organization, the server comprising: a processor, a memory, and a transceiver, wherein the processor executes a program stored in the memory to perform: adding transaction information of a transaction regarding a budget of the public organization to a first block of blocks which are periodically created when the transaction is generated, wherein the first block is created after a point of time at which the transaction is generated; betting a predetermined amount of stakes for each transaction information accumulated in the first block for a predetermined time interval and adding transaction information determined to be true by the bet to a block chain; and transmitting, by using the transceiver, the block chain to a server of other public organization or a third-party server, wherein the third-party server is located outside a network to which the server and the server of the other public organization are connected.

The processor, by using the transceiver, may further perform: receiving an access request for the block chain from the third-party server; and forwarding an instruction whether the access request is approved to the third-party server.

The processor, by using the transceiver, may further perform: allocating a predetermined amount of the stakes to the third-party server when the access request for the block chain from the third-party server is received.

When the processor performs the adding transaction information of a transaction regarding a budget of the public organization to a first block of blocks which are periodically created when the transaction is generated, the processor may perform creating a genesis block by inserting information about a date proving that the block chain has been crated after a particular point in time.

When the processor performs adding transaction information determined to be true by the bet to a block chain, the processor may perform: determining first transaction information to be true if an amount of stakes bet on the first transaction information of transaction information accumulated in the first block exceeds 50% of total stakes, wherein the total stakes includes stakes of the server, stakes of servers of other public organizations connected to the server, and stakes allocated to the third-party server.

When the processor performs adding transaction information determined to be true by the bet to a block chain, the processor may perform: determining second transaction information to be false if an amount of stakes bet on the second transaction information of transaction information accumulated in the first block does not exceed 50% of total stakes, wherein the total stakes includes stakes of the server, stakes of servers of other public organizations connected to the server, and stakes allocated to the third-party server.

When the processor performs adding transaction information determined to be true by the bet to a block chain, the processor may further perform: receiving a reward for a first amount of the stakes of the stakes allocated to the server when the first amount of the stakes is bet on that the first transaction information is true.

The transaction information may include expenditure information which is expenditure history of the budget and income information which is income history of the budget.

Yet another exemplary embodiment provides a system for managing transaction information of a public organization, the system comprising: a plurality of servers configured to create a block based on the transaction information of a transaction when the transaction performed by using a budget of the public organization is generated and add the block to a block chain so as to share the block chain between the plurality of the servers; and a third-party server configured to mine the block chain by adding a block to the block chain or by betting on the authenticity of the transaction information included in the block chain.

The third-party server may comprise a processor, a memory, and a transceiver, wherein the processor executes a program stored in the memory to perform: transmitting an access request for the block chain to a first server of the plurality of servers and receiving an access approval from the first server by using the transceiver; and mining the block chain after the access approval is received.

When the processor performs mining the block chain after the access approval is received, the processor may perform: adding the block to the block chain based on hash value of a previous block, a proof of work, and time information about a creation time of the block.

When the processor performs mining the block chain after the access approval is received, the processor may perform: betting a first amount of stakes of stakes allocated to the third-party server on that first transaction information of transaction information accumulated in the first block is true and receiving a reward for the first amount of the stakes if the first amount of the stakes exceeds 50% of total stakes; or betting the first amount of the stakes on that first transaction information is true and losing the first amount of the stakes if the first amount of the stakes does not exceed 50% of the total stakes, wherein the total stakes includes stakes of the plurality of servers and the stakes allocated to the third-party server.

DETAILED DESCRIPTION OF THE EMBODIMENTS

Figure 1:
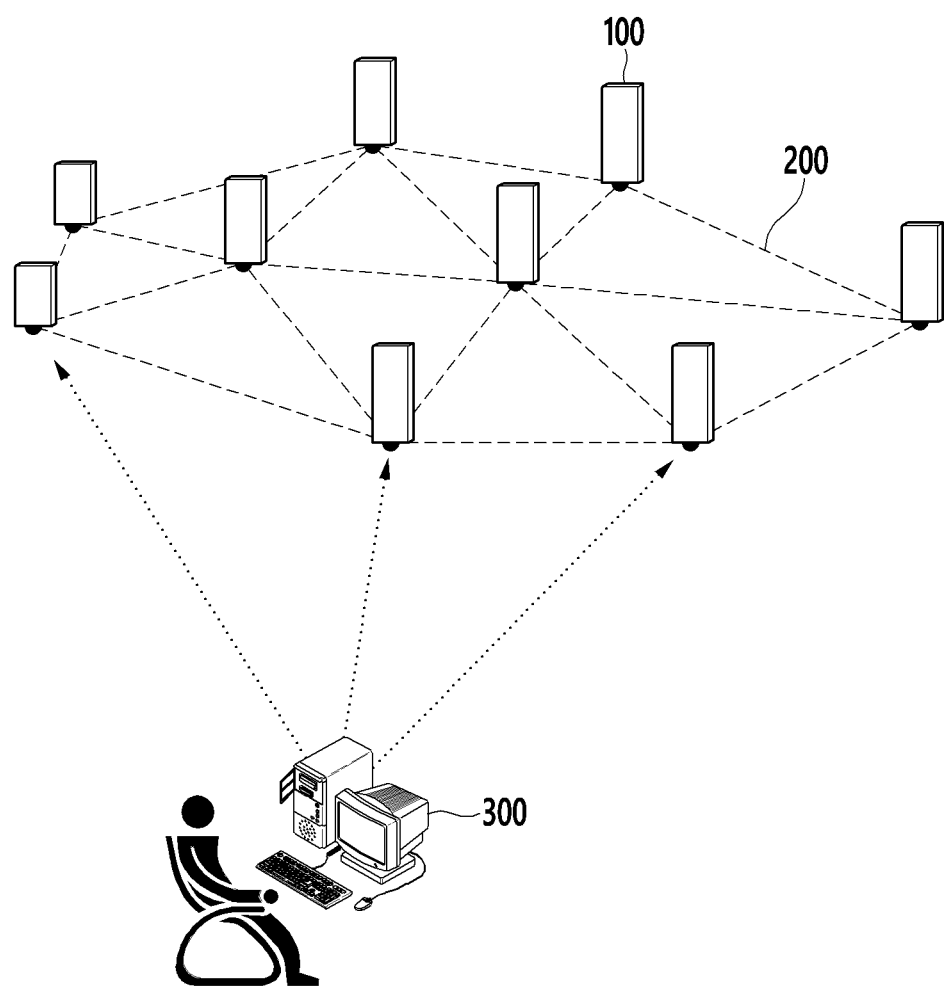
FIG. 1 is schematic diagram illustrating a transaction information managing system according to an exemplary embodiment.

Hereinafter, exemplary embodiments of the present invention will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification.

FIG. 1 is schematic diagram illustrating a transaction information managing system according to an exemplary embodiment.

Referring to FIG. 1, the transaction information managing system 10 according to an exemplary embodiment includes a plurality of servers 100 of a plurality of public organizations, interfaces connecting the plurality of servers 100, and a third-party server 300. The third-party server 300 is located outside a network to which the plurality of servers are connected.

Each server 100 located at the plurality of public organizations may create a block based on transaction information of a transaction regarding a budget of the public organizations when the transaction is generated, and then may add the generated block to a block chain.

The block chain may be shared between the plurality of servers 100. The transaction information may include expenditure information which is an expenditure history of the budget and income information which is an income history of the budget.

According to the exemplary embodiment, the block is an element of the block chain, and is information of the transaction performed by the public organizations. Thus, the block chain may indicate a bundle of the plurality of transaction information.

Each public organization, which is determined to manage the transaction information by using the block chain, may share information about an internet protocol (IP) address of each public organization, a port, and a protocol between the plurality of public organizations.

A public organization that meets a predetermined condition may be subscribed to a public organization group that manages the transaction information by using the block chain. For example, the public organization with a server having a predetermined minimum hash power may be subscribed to the public organization group. In addition, the maximum hash power of the public organization that is a member of the public organization group may be limited.

The minimum hash power and the maximum hash power may be determined as a size to prevent a 51% attack, and may be reduced as the number of the public organizations included in the public organizations group is increased. For example, when the number of the public organizations included in the public organizations group is n and a whole hash power of the public organizations group is 1, a hash power k of each public organization may be 1(1.2n) to 1/(0.8n).

$$\frac{1}{1.2n} \leq k \leq \frac{1}{0.8n} \quad \text{(Equation 1)}$$

Alternatively, the hash power k of each public organization may be fixed to 1/n (that is, k=1/n).

The interface 200 may connect the plurality of servers 100 by using a wired or wireless network.

The third-party server 300 may transmit an access request for the block chain to at least one server of the plurality of servers 100 and receive an access approval for the block chain so as to mine the block chain.

The functions of each component shown in FIG. 1 are described in detail below based on FIG. 2 and FIG. 3.

Figure 2:
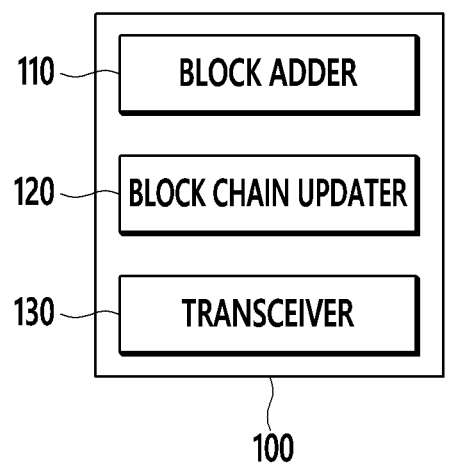
FIG. 2 is a schematic block diagram illustrating the server of the public organization according to an exemplary embodiment.
Figure 3:
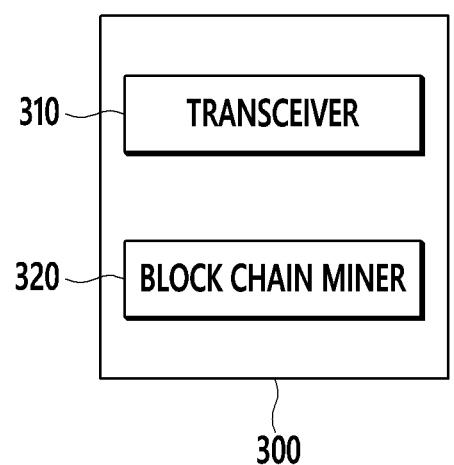
FIG. 3 is a schematic block diagram illustrating the third-party server according to an exemplary embodiment.

FIG. 2 is a schematic block diagram illustrating the server of the public organization according to an exemplary embodiment, and FIG. 3 is a schematic block diagram illustrating the third-party server according to an exemplary embodiment.

Referring to FIG. 2, the server 100 of the public organization includes a block adder 110, a block chain updater 120, and a transceiver 130.

The block adder 110 may create a block based on transaction information of a transaction when the transaction regarding a budget of the public organization is generated, and add the created block to a block chain.

The budget of the public organization may be a budget allocated by the state to the public organization or a contribution collected by a non-profit organization. The budget of the public organization is generally used for the business and operation of the public organization. Further, the block adder 110 may determine whether an access request of the third-party server can be approved.

The block chain updater 120 may update a block chain according to a predetermined period based on the block chain to which the block is added by the block adder 110 and at least one block chain received from other public organization by the transceiver 130. The block chain updater 120 updates the block chain once at the predetermined period by adding the blocks collected from each server 100 to the block chain, so that the block chain is kept up to date.

The transceiver 130 may transmit the updated block chain to the other public organizations or the third-party server 300 through the interface 200.

The third-party server 300 may mine the block chain about the transaction information based on an access approval for an access request transmitted to the server 100.

In the exemplary embodiment, the transceiver 130 may receive the block chain updated by the other public organization from the server of the other public organization. The transceiver 130 may receive the access request for the block chain from the third-party server 300, and forward an instruction whether the access request is approved to the third-party server 300.

Referring to FIG. 3, the third-party server 300 includes a transceiver 310 and block chain miner 320.

The transceiver 310 may transmit the access request for the block chain to the server 100 of the public organization, and receive the access approval for the request from the server 100 of the public organization. Then, the transceiver 310 may receive a reward from the public organization according the mining result of the block chain cheker 320 after the access approval is received.

The block chain miner 320 may mine the block chain after the access approval is received through the transceiver 310.

In the exemplary embodiment, the server 100 of the public organization may add the blocks to the block chain by performing a proof of work or a proof of stake.

The managing method of the transaction information of the public organization by the proof of work is described referring to FIG. 4 and the managing method of the transaction information of the public organization by the proof of stake is described referring to FIG. 5, below in detail.

Figure 4:
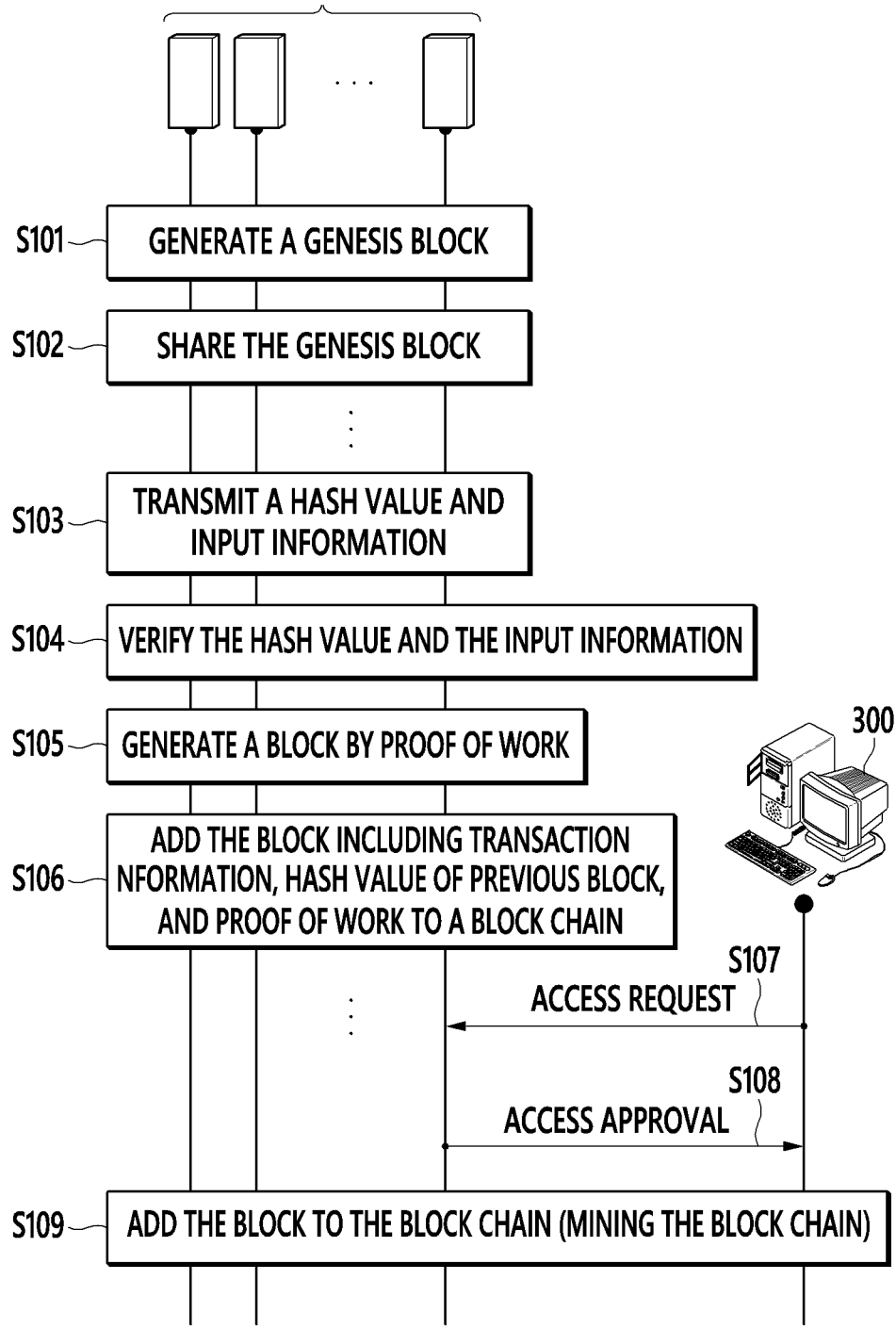
FIG. 4 is a flowchart illustrating a method for managing the transaction information by the proof of work according to an exemplary embodiment.

FIG. 4 is a flowchart illustrating a method for managing the transaction information by the proof of work according to an exemplary embodiment.

The server 100 of at least one public organization of the plurality of public organizations creates a genesis block for the block chain (S101).

The genesis block includes information about a date which is user to prove that the block chain has been created after a particular point of time. The information about the date may include brief description of the events in various fields, such as politics, economy, society, and culture, occurring at the particular point of time.

The server 100 which creates the genesis block may search servers of the other public organizations based on the IP address and port of the servers, and protocol shared among the public organizations subscribed to the public organization group, and transmit the genesis block to the searched server. That is, the genesis block is shared among the servers of the plurality of public organizations (S102).

Then, the updated block chain at each server 100 may be shared among the other servers of the public organizations. When the transactions performed by the public organizations are completed and the transaction information is generated, the transaction information is stored in a transaction information pool.

The server 100 yields a hash value by using at least one of transaction information stored in the transaction information pool, a nonce value, a timestamp, and a public key as input information, and transmits the hash value and the input information to the other server (S103).

The other server that receives the hash value and the input information including the transaction information verifies a validity of the hash value and the transaction information based on information of the server 100 that transmits the hash value, such as past transaction information (S104).

Thereafter, the verified transaction information among the transaction information stored in the transaction information pool may be added to the block chain by being included in the block by each server 100.

Each server 100 performs the proof of work to create the block to be added to the block chain (S105). For example, the sever 100 of the public organization may create the block by resolving a work (referred to as the proof of work).

According to the exemplary embodiment, since the work that server 100 resolves is provided so as to take a predetermined amount of time to resolve under predetermined computing performance, the server 100 continuously resolves the work even when the transaction information is not generated, thereby generating the block. Therefore, the server 100 may add a block that does not include the transaction information to the block chain.

According to the exemplary embodiment, the block may include at least one of 1) transaction information, 2) a hash value of a previous block, 3) the proof of work, 4) the time information about the point of time at which the block is generated. For example, transaction information is not included in the block generated by the server 100 while the transaction information is not generated.

When the valid transaction information is included in the transaction information pool, the server 100 add at least one of the transaction information stored in the transaction information pool, the hash value of the previous block, the proof of work, and the time information about the point of time at which the block is generated to the block generated by resolving the work, and add the block to the block chain (S106). The proof of work may be a unique identifier such as an identification of the server 100 or media access control (MAC) address which is capable of uniquely identifying the server 100 of the public organization that resolves the work.

The third-party server 300 transmits an access request for the block chain to at least one public organization among the plurality of public organizations belonging to the public organization group (S107).

If the server of the public organization that receives the access request does not have sufficient hash power, the access request of the third-party server 300 is denied.

Therefore, the server 100 of the public organization that receives the access request may determine whether the access request is approved based on the hash power of the third-party server 300. For example, since the third-party server 300 may execute a 51% attack, the server 100 may send the access approval to the third-party server 300 when the hash power of the third-party server 300 is less than the hash power of the server 100 that received the access request.

When the server of the public organization that received the access request sends the access approval to the third-party server 300 (S108), the third-party server 300 starts mining the block chain (S109).

According to the exemplary embodiment, the addition of the block to the block chain performed by the third-party server 300 is referred to as 'mining of the block chain', and the third-party server 300 may mine the block chain by following method.

In the case of the proof of work, the third-party server 300 may resolve the work through a mathematical operation and receive a reward for the resolution. The third-party server 300 may add the block including the hash value of the previous block, the proof of work, and the time information about the point of time at which the block is generated to the block chain, so as to mine the block chain.

According to the exemplary embodiment, the reliability of the block chain shard among the plurality of public organizations may be enhanced by the blocks added by the third-party server 300. In this case, the third-party server 300, which does not receive the access approval from the server of the public organization, may not share the block chain. Instead, the third-party server 300 may perform monitoring on the block chain.

Figure 5:
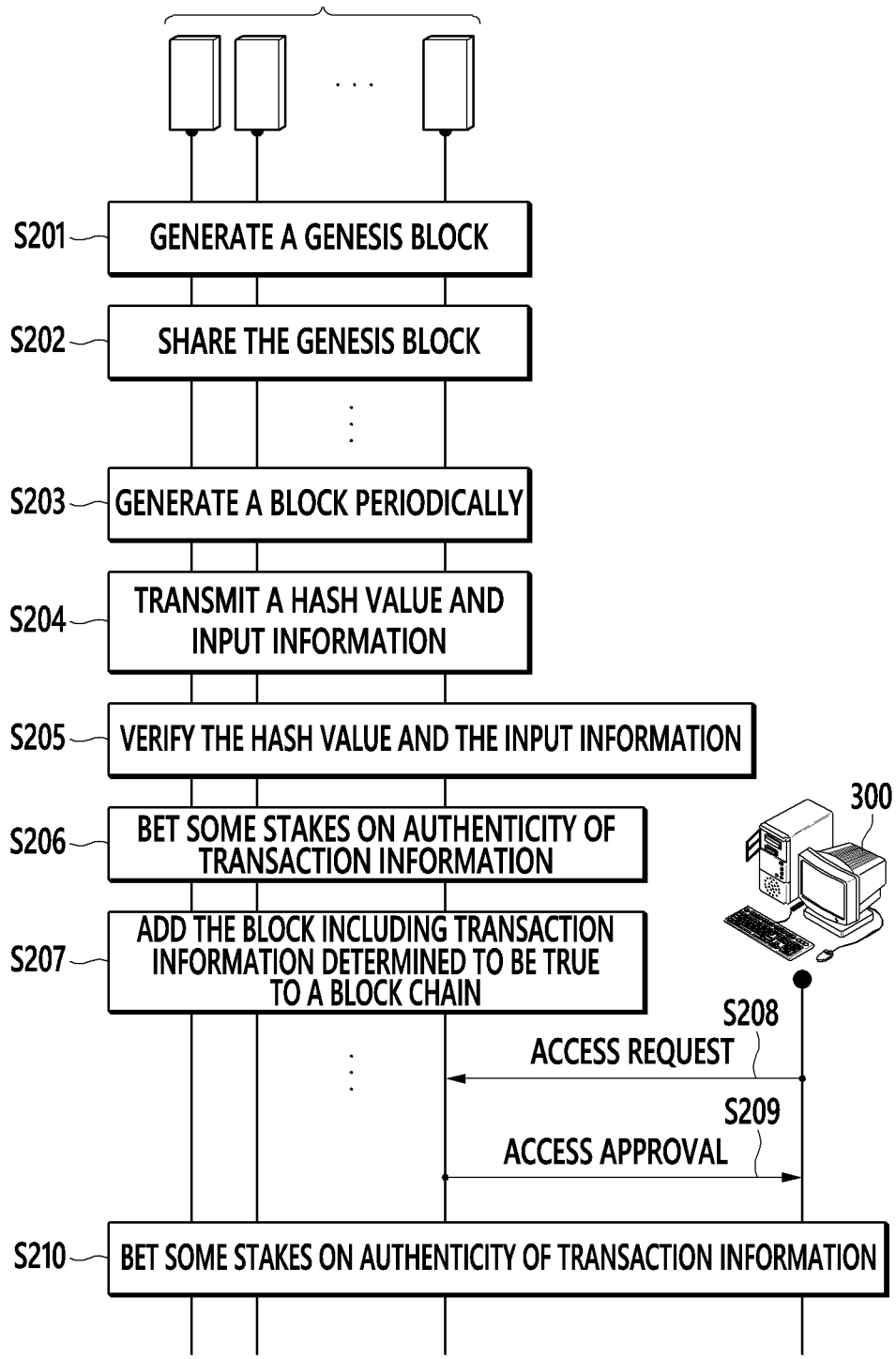
FIG. 5 is a flowchart illustrating a method for managing the transaction information by the proof of stake according to an exemplary embodiment.

FIG. 5 is a flowchart illustrating a method for managing the transaction information by the proof of stake according to an exemplary embodiment.

In the case of the proof of stake, the step of S201 for generating the genesis block and the step of S202 for sharing the genesis block among the servers 100 of the plurality of public organizations are the same as the proof of work.

In the case of the proof of stake, the block is periodically generated according to a predetermined time interval (S203). Thereafter, when the transaction information is generated by a server of one public organization, the generated transaction information is stored in the transaction information pool.

In this case, the transaction information pool may be shared among the plurality of servers 100 and the third-party server 300.

The server 100 calculates the hash value by using at least one transaction information stored in the transaction information pool, a nonce value, a timestamp, and the public key as the input information, and transmits the calculated hash value and the input information to the other server (S204).

The other server that receives the hash value and the input information including the transaction information verifies a validity of the hash value and the transaction information based on information of the server 100 that transmits the hash value, such as past transaction information (S205). Thereafter, the verified transaction information is accumulated in the transaction information pool.

The block chain updater 120 of the server 100 or the block chain miner 320 of the third-party server 300 bets a predetermined amount of stakes on each transaction information accumulated to the transaction information pool during a predetermined time interval (S206). That is, the server 100 or the third-party server 300 may bet the predetermined amount of the stakes on TRUE or FALSE of the transaction information.

Then, the block chain updater 120 of the server 100 or the block chain miner 320 of the third-party server 300 carries the transaction information determined to be true in the block generated according to the predetermined time interval, and adds the block including the transaction information to the block chain (S207).

The block added to the block chain may include the transaction information that is agreed to be true on the basis of the amount of the betted stakes among the transaction information accumulated for the predetermined time interval. For example, if the block is periodically generated in every 5 seconds and the transaction information are respectively generated at two public organizations, the block generated at a period of 5 seconds includes the transaction information in which the amount of the betted stakes exceeds 50% of the whole stakes.

The stakes x having an arbitrary amount may be provided to the server 100 at the point of time at which the server 100 participates in the block chain network.

The server of the public organization or the third-party server 300 may send the access request to the servers which already belongs to the block chain network, and the block chain updater 120 of the servers may allocate a predetermined amount of stakes x to the server of other public organization or the third-party server 300 which transmits the access request.

The stakes y that the server 100 may allocate to another sever or the third-party server 300 may be determined at the time when the server 100 participates in the block chain network.

According to the exemplary embodiment, each server 100 needs the transaction information, the hash value of the previous block, and the certificate of the server to add the block to the block chain by the proof of stakes. The server 100 of the public organization may transmit the transaction information, the hash value of the previous block, and the certificate of the server to other servers after the transaction information is generated.

The other server or the third-party server 300 that receives the transaction information, the hash value of the previous block, and the certificate of the server may verify the validity of the transaction information and bet some stakes of the stakes x when the transaction information is verified to be true. For example, when the stakes x allocated to the server 100 or third-party server 300 is 200, the server 100 or the third-party server 300 may bet some stakes of 200 on TRUE of the transaction information.

If the betted stakes on the transaction information exceed 50% of the whole stakes including the stakes of the total servers included in the block chain network and the stakes of the third-party server 300, the transaction information of the server 100 is added to the block chain.

Then the server 100 or the third-party server 300 which bets on TRUE of the transaction information may receive the reward for the betted stakes. For example, a predetermined amount of the stakes may be provided as the reward.

If the betted stakes on the transaction information does not exceed 50% of the whole stakes, the transaction information may not be able to be added to the block and the betted stakes may be deleted. That is, the server 100 or the third-party server 300 which betted on TRUE of the transaction information may lose the betted stakes.

In the case of the proof of stakes, since the block is generated periodically, the third-party server 300 may mine the block chain by betting on the authenticity of the transaction information included in the block. That is, in the case of the proof of stakes, the third-party server 300 may contribute to the reliability improvement of the block chain by betting on the authenticity of the transaction information.

The third-party server 300 transmits the access request to the server of the public organization among the plurality of public organizations which belongs to the public organization group (S208). If the server of the public organization that receives the access request from the third-party server 300 does not have sufficient stakes to be allocated, the access request of the third-party server 300 is denied.

When the server of the public organization that received the access request sends the access approval to the third-party server 300 (S209), the third-party server 300 starts mining the block chain (S210).

According to another exemplary embodiment, the betting the stakes on the transaction information performed by the third-party server 300 is referred to as 'mining of the block chain'. Therefore, in the case of the proof of stake, the reliability of the block chain may be increased by betting the stakes of the third-party server 300.

Figure 6:
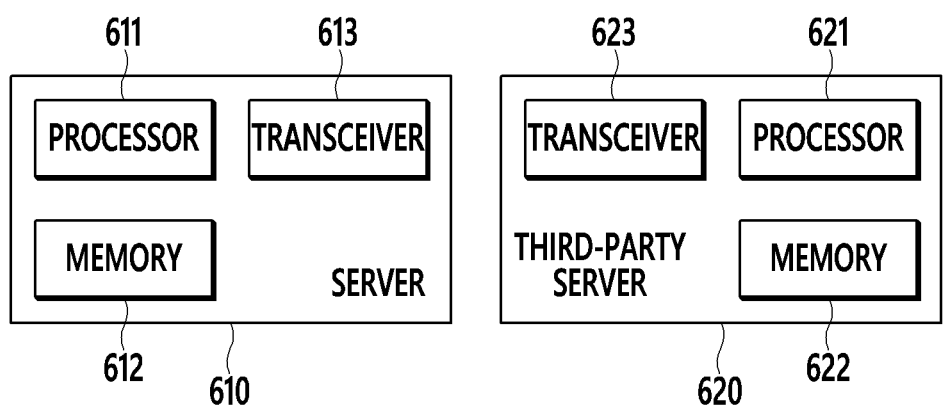
FIG. 6 is a block diagram illustrating a transaction information managing system according to another exemplary embodiment.

FIG. 6 is a block diagram illustrating a transaction information managing system according to another exemplary embodiment.

Referring to FIG. 6, the transaction information managing system according to another exemplary embodiment includes a server of the public organization 610 and a third-party server 620 located outside the network to which the server 610 belongs.

The server 610 includes a processor 611, a memory 612, and a transceiver 613. The memory 612 may be connected to the processor 611 to store various pieces of information for driving the processor 611 or at least one program executed by the processor 611. The transceiver 613 may be connected to the processor 611 to transmit/receive a wired/wireless signal with other server or the third-party server 620. The processor 611 may implement functions, processes, or methods proposed by the exemplary embodiment. In this case, in the transaction information managing system according to another exemplary embodiment, a wired/wireless interface protocol layer may be implemented by the processor 611. An operation of the server 610 according to another exemplary embodiment may be implemented by the processor 611.

The third-party server 620 includes a processor 621, a memory 622, and a transceiver 623. The memory 622 may be connected to the processor 621 to store various pieces of information for driving the processor 621 or at least one program executed by the processor 621. The transceiver 623 may be connected to the processor 621 to transmit/receive a wired/wireless signal with the server 610 or other third-party server. The processor 621 may implement functions, processes, or methods proposed by the exemplary embodiment. In this case, in the transaction information managing system according to another exemplary embodiment, a wired/wireless interface protocol layer may be implemented by the processor 621. An operation of the server 620 according to another exemplary embodiment may be implemented by the processor 621.

According to another exemplary embodiment, the memory may be positioned inside or outside the processor, and the memory may be connected to the processor through various already known means. The memory may be various types of volatile or non-volatile storage media. For example, the memory may include a read-only memory (ROM) or a random access memory (RAM).

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A server for managing transaction information of a public organization, the server comprising:
   a processor, a memory, and a transceiver, wherein the processor executes a program stored in the memory to perform:
      creating a block based on the transaction information of a transaction when the transaction regarding a budget of the public organization is generated;
      adding the created block to a first blockchain,
      updating a blockchain according to a predetermined period based on a second blockchain in which a block is added by a server of other public organization or a third blockchain in which a block is added by a third-party server, and the first blockchain;
      transmitting the first blockchain to the server of the other public organization or the third-party server and receiving the second blockchain or the third blockchain from the server of the other public organization or the third-party server, respectively, by using the transceiver,
   wherein the third-party server is located outside a network to which the server and the server of the other public organization are connected,
   wherein hash power of the server is $1/(1.2n)$ to $1/(0.8n)$ when the blockchain is shared by servers of n public organizations and whole hash power of the servers of the n public organizations is 1, and
   wherein when the processor performs updating the blockchain according to the predetermined period, the processor, by using the transceiver, performs:
      receiving an access request for the blockchain from the third-party server; and forwarding an access approval to the third-party server when hash power of the third-party server is less than the hash power of the server.

2. The server of claim 1, wherein the processor, by using the transceiver, further performs:
receiving an access request for the blockchain from the third-party server;
forwarding an instruction whether the access request is approved to the third-party server; and
receiving the third blockchain from the third-party server when the access request is approved.

3. The server of claim 1, wherein when the processor performs creating a block based on the transaction information of a transaction when the transaction regarding a budget of the public organization is generated, the processor performs:
creating a genesis block by inserting information about a date proving that the blockchain has been crated after a particular point of time.

4. The server of claim 1, wherein: hash power of the server is 1/n when the blockchain is shared by servers of n public organizations and whole hash power of the servers of the n public organizations is 1.

5. The server of claim 1, wherein when the processor performs adding the created block to a first blockchain, the processor performs:
creating the block based on at least one of the transaction information, a proof of work, and time information of a point of time at which the block is created, wherein the work is information that takes a predetermined amount of time to resolve under predetermined computing performance.

6. The server of claim 1, wherein the transaction information includes expenditure information which is an expenditure history of the budget and income information which is an income history of the budget.

7. A system for managing transaction information of a public organization, the system comprising:
a plurality of servers configured to create a block based on the transaction information of a transaction when the transaction performed by using a budget of the public organization is generated and add the block to a blockchain so as to share the blockchain between the plurality of the servers; and
a third-party server configured to transmit an access request for the blockchain to a first server of the plurality of servers and mine the blockchain by adding a block to the blockchain,
wherein hash power of the server is $1/(1.2n)$ to $1/(0.8n)$ when the blockchain is shared by servers of n public organizations and whole hash power of the servers of the n public organizations is 1, and
the first server is configured to transmit an access approval to the third-party server when hash power of the third-party server is less than the hash power of the first server; and the third-party server is configured to perform the mining of the blockchain after receiving the access approval from the first server of the plurality of servers.

8. The system of claim 7, wherein when the processor performs mining the blockchain after the access approval is received, the processor performs:
adding the block to the blockchain based on hash value of a previous block, a proof of work, and time information about a creation time of the block.

* * * * *